No. 672,598. Patented Apr. 23, 1901.
W. F. DREW.
PIPE COUPLING.
(Application filed Jan. 11, 1901.)
(No Model.)
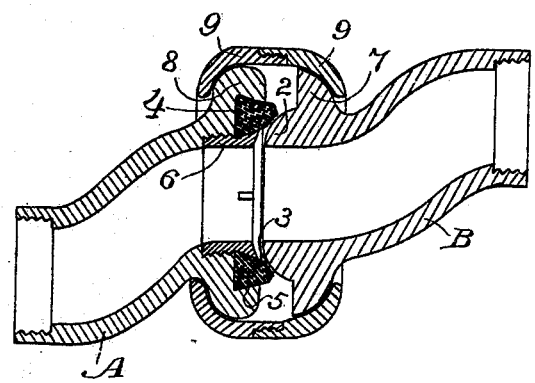
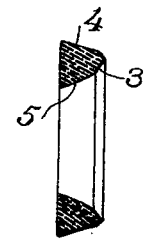
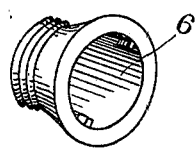
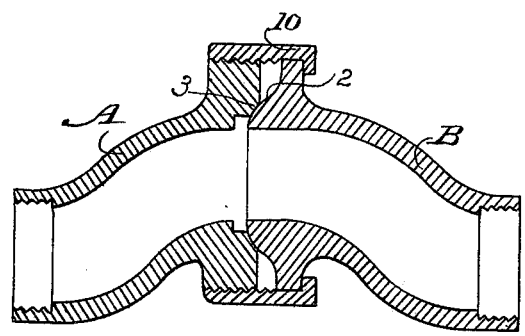
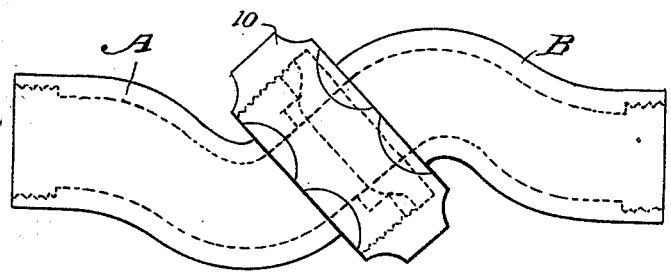
Witnesses,
Inventor
Warren F. Drew
By Dewey Strong & Co.
Att'ys

UNITED STATES PATENT OFFICE.

WARREN FRANCIS DREW, OF SACRAMENTO, CALIFORNIA.

PIPE-COUPLING.

SPECIFICATION forming part of Letters Patent No. 672,598, dated April 23, 1901.

Application filed January 11, 1901. Serial No. 42,876. (No model.)

*To all whom it may concern:*

Be it known that I, WARREN FRANCIS DREW, a citizen of the United States, residing at Sacramento, county of Sacramento, State of California, have invented an Improvement in Pipe-Couplings; and I hereby declare the following to be a full, clear, and exact description of the same.

My invention relates to a coupling for the contiguous ends of pipes and a construction by which I am enabled to unite pipes at any angle at which they may meet each other and to form tight joints at such angles or any change thereof that may be afterward made.

It consists of pipes or sections having the ends adapted to meet each other squarely in whatever direction the pipes may extend from the joint, said pipes or sections being made with reverse curves adjacent to their meeting ends, whereby the axes of the pipes will stand in approximately the same line at their point of junction, while the pipes extending away from the joint may stand at any angle with each other between an approximately straight line and a right angle.

My invention also relates to means for forming the joint, preventing the breakage of pipe by strain or jar, and to details of construction, which will be more fully explained by reference to the accompanying drawings, in which—

Figure 1 is a longitudinal section through the pipe-coupling when used as a passage for air. Fig. 2 is a detail section of the rubber packing. Fig. 3 is a view of the thimble. Fig. 4 is a longitudinal section through the coupling when used as a passage for liquids. Fig. 5 is an external view of the coupling.

In forming joints for pipes which may be put together at various angles with relation to each other it is important that the bore of the pipes at their junction should coincide and stand approximately in line with each other, so as to prevent any such angular disposition of the pipe-openings as would tend to cut off or interfere with the smooth flow of the water when passing through the joint. In order to effect this, the pipe-sections A and B are bent to form reverse curves adjacent to their meeting ends, so that these ends can be brought squarely together with reference to the axes of the two pipes, and thus make a smooth uninterrupted opening for the flow of the fluid which is to pass through them. With this construction and a suitable means for connecting them together the pipes may be made to stand in an essentially straight line with a small offset at such joints, or they may be turned with relation to each other to stand at any intermediate angle between this first position and a right angle, and in all of said changes the two pipe ends will open squarely into each other, as shown.

In order to make a suitable joint, the end of one of the pipes is formed with a globular segment 2, and the other pipe has a correspondingly-shaped socket 3, into which the globular end will meet. These meeting sections may be ground so as to form a tight joint, or the part which is to form a socket portion may be made of rubber or other elastic material, as shown at 4, which when the two ends are drawn together will be depressed, so as to naturally fit and form a joint with the globular portion 2. When constructed in this manner, the elastic seat 4 is fitted into an undercut channel, as at 5, into which it is sprung, so as to form a sort of dovetail in cross-section, as shown in Figs. 1 and 2. The inner portion of the elastic seat 4 is correspondingly clamped and held in place by a thimble 6, which screws into the correspondingly-threaded inner portion of the pipe-section 6, and the outer surface of this thimble is beveled outwardly, so that it clamps upon the inner rim of the elastic seat, which is thus firmly held and compressed into place, so that in cross-section it represents a dovetail lock, which firmly holds it in its place.

When properly clamped together, with the part 2 contacting with this elastic seat, it will be seen that the pipes forming the joint will be capable of some movement with relation to each other without any danger of breaking them by such strain, and they are also relieved from the constant jar which frequently crystallizes and breaks pipes such as are used in the conduction of air in connection with air-brakes upon cars and for other like purposes. In order to draw the two sections of this joint firmly together and hold them in place, I have shown the parts A and B formed with convex flanges 7 and 8, and over these flanges are fitted concaved annular collars, as 9, which are threaded at their meeting edges, so as to form what is termed a "split" nut. The two being screwed together will be drawn firmly against the globular surfaces 7 and 8, which, fitting in the correspondingly-concaved surfaces of the nut, allow of any desired movement for the adjustment of the pipes to the required angle, after which the two parts of the nut may be screwed firmly down until the joint is hermetically closed and immovable, except for the elasticity previously mentioned.

If the joint is to be made of metal, the globular head and the corresponding concavity of the other pipe-section will be drawn together by means of a nut, as 10, having a lip upon one side, which engages an enlargement of the pipe-section and having screw-threads at its opposite side which fit upon a screw-threaded flange of the opposite section of pipe, and when this is screwed down tight the two parts of the joint are brought together and locked, as previously described.

Having thus described my invention, what I claim as new, and desire to secure by Letters Patent, is—

1. A pipe joint or coupling consisting of sections having the meeting ends fitting each other with the bores axially in line, said sections forming each a reverse curve contiguous to the joint, and means including substantially a circumferential inclosing nut for connecting them together.

2. A pipe joint or coupling consisting of pipe-sections having the adjacent ends reversely curved so that the meeting ends of the pipes stand axially in line, a globular segment formed upon one of said ends, a corresponding concavity into which said segment fits in the other section, and a clamping-nut by which the parts are held together, said nut allowing the pipe-sections to be adjusted and locked.

3. A pipe joint or coupling consisting of pipe-sections having the adjacent ends reversely curved to meet upon a central line axial to both ends, a globular segmental head formed on one of said ends, a correspondingly-fitted concavity upon the other end, flanges formed exterior to each of said ends having convex outer peripheries, a split nut having its two parts screw-threaded so as to be united, the interior of said parts being concaved to fit the corresponding convex surfaces of the pipe ends.

4. A pipe joint or coupling, consisting of reversely-curved pipe-sections having the ends meeting each other in a line axial to both, a convex segment formed upon one of said meeting ends, an elastic ring fitted into the other end and capable of compression so as to fit and form a joint with the opposing convex head, flanges upon each of said meeting ends having convex exterior surfaces and a nut formed of two parts, one of which fits each of said convex surfaces, and screw-threads by which the two parts of said nut and the coupling are drawn together.

5. A pipe joint or coupling consisting of two reversely-curved pipe-sections, the ends of which meet upon a line axial to both, a convex segment formed upon one of said pipe ends, a corresponding yielding section upon the other adapted to form a joint with said head, means for securing said yielding section, consisting of an undercut channel in the pipe end and a thimble adapted to screw into the pipe interior to the yielding ring, said thimble having its outer surface made divergent whereby the ring is clamped within the dovetailed channel thus formed.

6. The combination in a pipe joint or coupling of reversely-curved pipes adjustable with relation to each other, one of said pipes having a rigid globular segmental end, and the other a yielding ring, and means for clamping said ring in said pipe to form a seat for the opposing globular head, and a screw-threaded nut whereby the two ends are drawn together and fixed after the angle of divergence of the pipes has been determined.

In witness whereof I have hereunto set my hand.

WARREN FRANCIS DREW.

Witnesses:
J. S. DALY,
J. FRANK BROWN.